United States Patent
Asaad et al.

(10) Patent No.: US 8,788,512 B2
(45) Date of Patent: Jul. 22, 2014

(54) GENERATING DATA FEED SPECIFIC PARSER CIRCUITS

(75) Inventors: Sameh W. Asaad, Briarcliff Manor, NY (US); Roger Moussalli, Riverside, CA (US); Bharat Sukhwani, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/479,132

(22) Filed: May 23, 2012

(65) Prior Publication Data

US 2013/0318107 A1 Nov. 28, 2013

(51) Int. Cl.
*G06F 17/30* (2006.01)

(52) U.S. Cl.
USPC .......................................... 707/755; 707/803

(58) Field of Classification Search
CPC ....... G06F 8/37; G06F 17/27; G06F 17/2705; G06F 17/272
USPC ................................................. 707/755, 803
See application file for complete search history.

(56) References Cited

U.S. PATENT DOCUMENTS

| | | | |
|---|---|---|---|
| 5,987,432 A | 11/1999 | Zusman et al. | |
| 7,417,568 B2 | 8/2008 | Fallon et al. | |
| 7,647,423 B2 | 1/2010 | Das et al. | |
| 7,818,333 B2 * | 10/2010 | Biard et al. | 707/763 |
| 7,921,046 B2 | 4/2011 | Parsons et al. | |
| 7,937,679 B2 * | 5/2011 | Mariani | 716/104 |
| 7,954,114 B2 | 5/2011 | Chamberlain et al. | |
| 8,069,102 B2 | 11/2011 | Indeck et al. | |
| 8,144,590 B2 | 3/2012 | Broberg et al. | |
| 8,285,708 B2 * | 10/2012 | Bowers et al. | 707/713 |
| 2004/0042506 A1 | 3/2004 | Fallon et al. | |
| 2004/0083466 A1 * | 4/2004 | Dapp et al. | 717/143 |
| 2007/0078837 A1 | 4/2007 | Indeck et al. | |
| 2007/0174841 A1 | 7/2007 | Chamberlain et al. | |
| 2008/0034055 A1 | 2/2008 | Das et al. | |
| 2008/0140554 A1 | 6/2008 | Christy et al. | |
| 2008/0162513 A1 * | 7/2008 | Biard et al. | 707/100 |
| 2008/0244072 A1 | 10/2008 | Broberg et al. | |
| 2008/0276206 A1 * | 11/2008 | Mariani | 716/4 |
| 2011/0044522 A1 * | 2/2011 | Fancourt et al. | 382/131 |
| 2012/0233345 A1 * | 9/2012 | Hannuksela | 709/231 |
| 2013/0170561 A1 * | 7/2013 | Hannuksela | 375/240.25 |

OTHER PUBLICATIONS

Pannenko et al., "IPRO-313 Fall 2007—Ultra-High-Speed Market Data System," Illinois Institute of Technology, Fall 2007, pp. 1-19.

(Continued)

*Primary Examiner* — Phong Nguyen
(74) *Attorney, Agent, or Firm* — Yee & Associates, P.C.; Anne Dougherty

(57) ABSTRACT

Generating a data feed specific parser circuit is provided. An input of a number of bytes of feed data associated with a particular data feed that the data feed specific parser circuit is to process is received. A feed format specification file that describes a data format of the particular data feed is parsed to generate an internal data structure of the feed format specification file. A minimum number of parallel pipeline stages in the data feed specific parser circuit to process the number of bytes of feed data associated with the particular data is determined based on the generated internal data structure of the feed format specification file. Then, a description of the data feed specific parser circuit with the determined number of parallel pipeline stages is generated.

19 Claims, 12 Drawing Sheets

(56) References Cited

OTHER PUBLICATIONS

Subramoni et al., "Streaming Low-Latency Communication in Online Trading Systems," IBM Research Division and the Ohio State University, Yorktown Heights, New York and Columbus, Ohio, Apr. 9, 2010, 10 pages.
Agarwal et al., "Faster FAST: Multicore Acceleration of Streaming Financial Data," Proceedings of the 2009 Computer Science-Research and Development, CSRD, Jun. 2009, 11 pages.
Teubner et al., "Snowfall: Hardware Stream Analysis Made Easy," Proceedings of the 14th GI-Fachtagung Datenbanksysteme für Business, Technologie und Web, Kaiserslautern, Germany, Mar. 2011, 4 pages.
Sadoghi et al., "Efficient Event Processing through Reconfigurable Hardware for Algorithmic Trading," Proceedings of the 2010 VLDB Endowment, 3(2):1525-1528, 2010.
Morris et al., "FPGA Accelerated Low-Latency Market Data Feed Processing," 17th IEEE Symposium on High Performance Interconnects, New York, New York, pp. 83-89, Aug. 2009.
Pottathuparambil et al., "Low-latency FPGA Based Financial Data Feed Handler," Proceedings of the 19th Annual IEEE Annual International Symposium on Field-Programmable Custom Computing Machines, Salt Lake City, Utah, May 2011, pp. 93-96.

\* cited by examiner

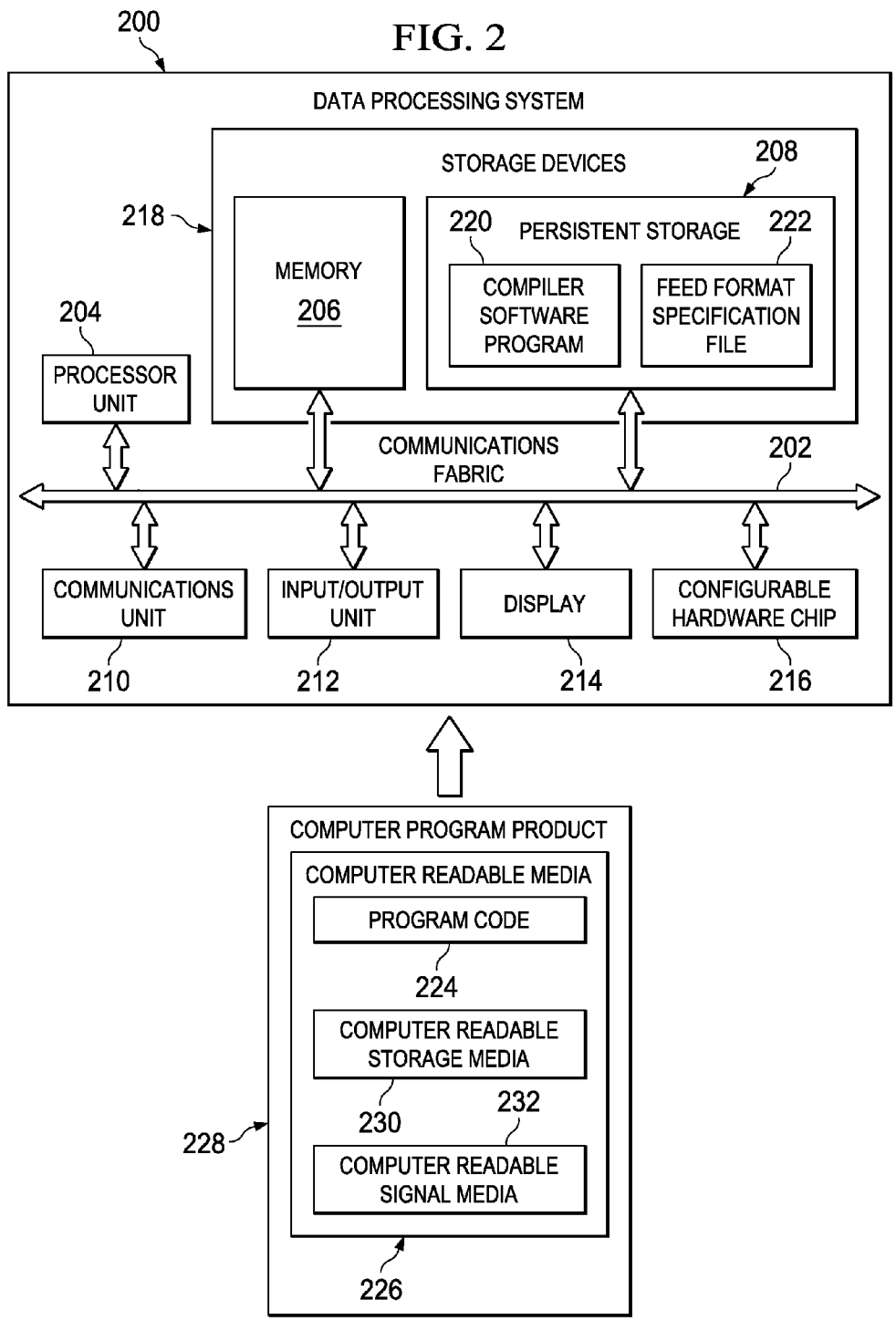

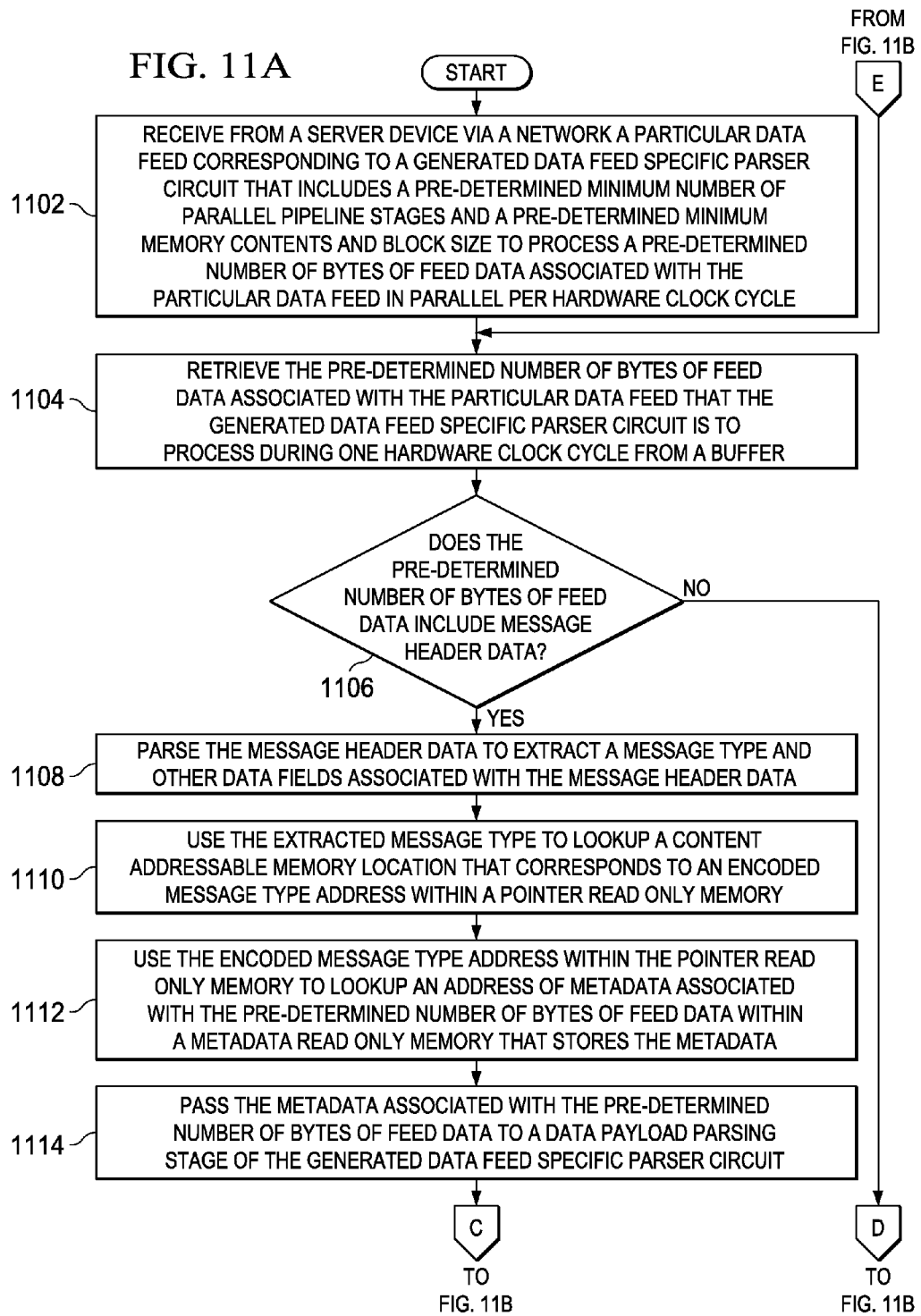

GENERATING DATA FEED SPECIFIC PARSER CIRCUITS

BACKGROUND

1. Field

The disclosure relates to a computer implemented method, computer system, and computer program product for generating a data feed specific parser circuit.

2. Description of the Related Art

In finance, market data are quote and trade-related data. Market data are numerical buy/sell price data, reported from trading venues, such as stock exchanges. The buy/sell price data are attached to a ticker symbol and additional data about the trade. This buy/sell price data are used to make on-the-spot decisions about buying or selling. Delivery of this buy/sell price data from stock exchanges to users, such as traders, is highly time-sensitive, approaching real time. Stock exchanges broadcast this buy/sell price data using financial feeds. Specialized technologies called ticker plants are software designed to process the financial feeds and route the market data to subscribers, generating millions of messages per second. The subscribers to the financial feeds extract data fields from the received messages of the financial feed that are used for certain computations, which affect trading decisions.

SUMMARY

According to one embodiment of the present invention, a computer implemented method for generating a data feed specific parser circuit is provided. An input of a number of bytes of feed data associated with a particular data feed that the data feed specific parser circuit is to process is received. A feed format specification file that describes a data format of the particular data feed is parsed using a compiler to generate an internal data structure of the feed format specification file. A minimum number of parallel pipeline stages in the data feed specific parser circuit to process the number of bytes of feed data associated with the particular data feed in parallel during a hardware clock cycle is determined based on the generated internal data structure of the feed format specification file. Then, a description of the data feed specific parser circuit with the determined minimum number of parallel pipeline stages is generated. In other embodiments of the present invention, a computer system and a computer program product for generating a data feed specific parser circuit are provided.

In a further embodiment of the present invention, a computer implemented method for processing a particular data feed by a generated data feed specific parser circuit is provided. A particular data feed that corresponds to a generated data feed specific parser circuit is received. The generated data feed specific parser circuit includes a pre-determined minimum number of parallel pipeline stages and a pre-determined minimum memory block size to process a pre-determined number of bytes of feed data associated with the particular data feed. Payload data associated with the pre-determined number of bytes of feed data are parsed to extract one message field for each of the pre-determined minimum number of parallel pipeline stages from the pre-determined number of bytes of feed data using metadata associated with the pre-determined number of bytes of feed data. Each of a plurality of extracted message fields is processed in parallel using the pre-determined minimum number of parallel pipeline stages during a hardware clock cycle to extract a field identifier and a field value from each processed message field. Then, the field identifier and the field value of each processed message field are outputted.

BRIEF DESCRIPTION OF THE SEVERAL VIEWS OF THE DRAWINGS

FIG. 2 is a diagram of a data processing system in which illustrative embodiments may be implemented;

FIGS. 11A-11B are a flowchart illustrating a process for processing a particular data feed by a generated data feed specific parser circuit in accordance with an illustrative embodiment.

DETAILED DESCRIPTION

Figure 1:
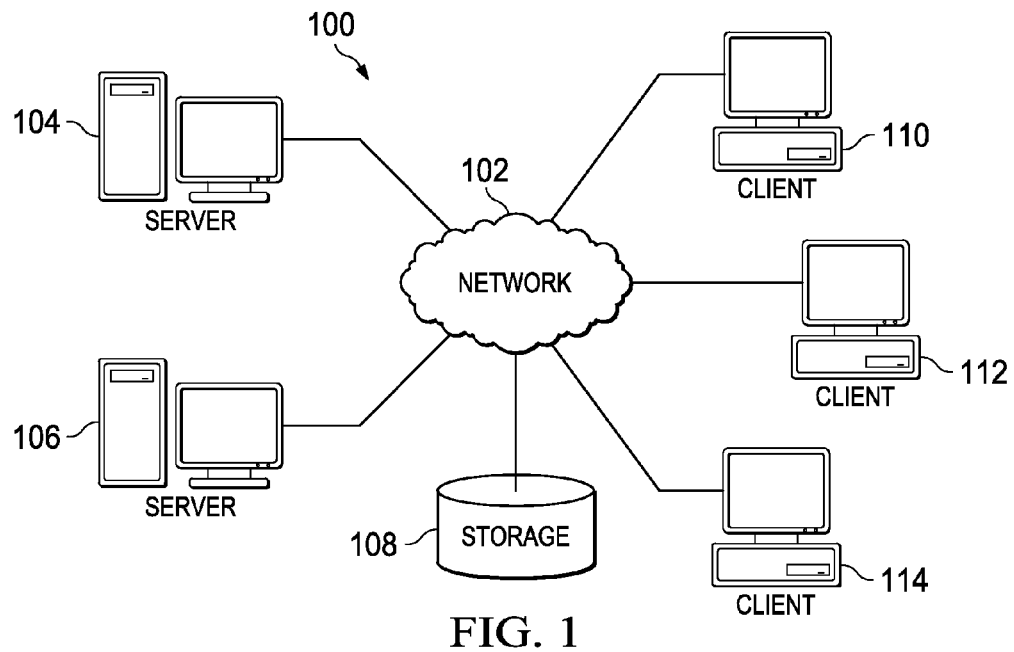
FIG. 1 is a pictorial representation of a network of data processing systems in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
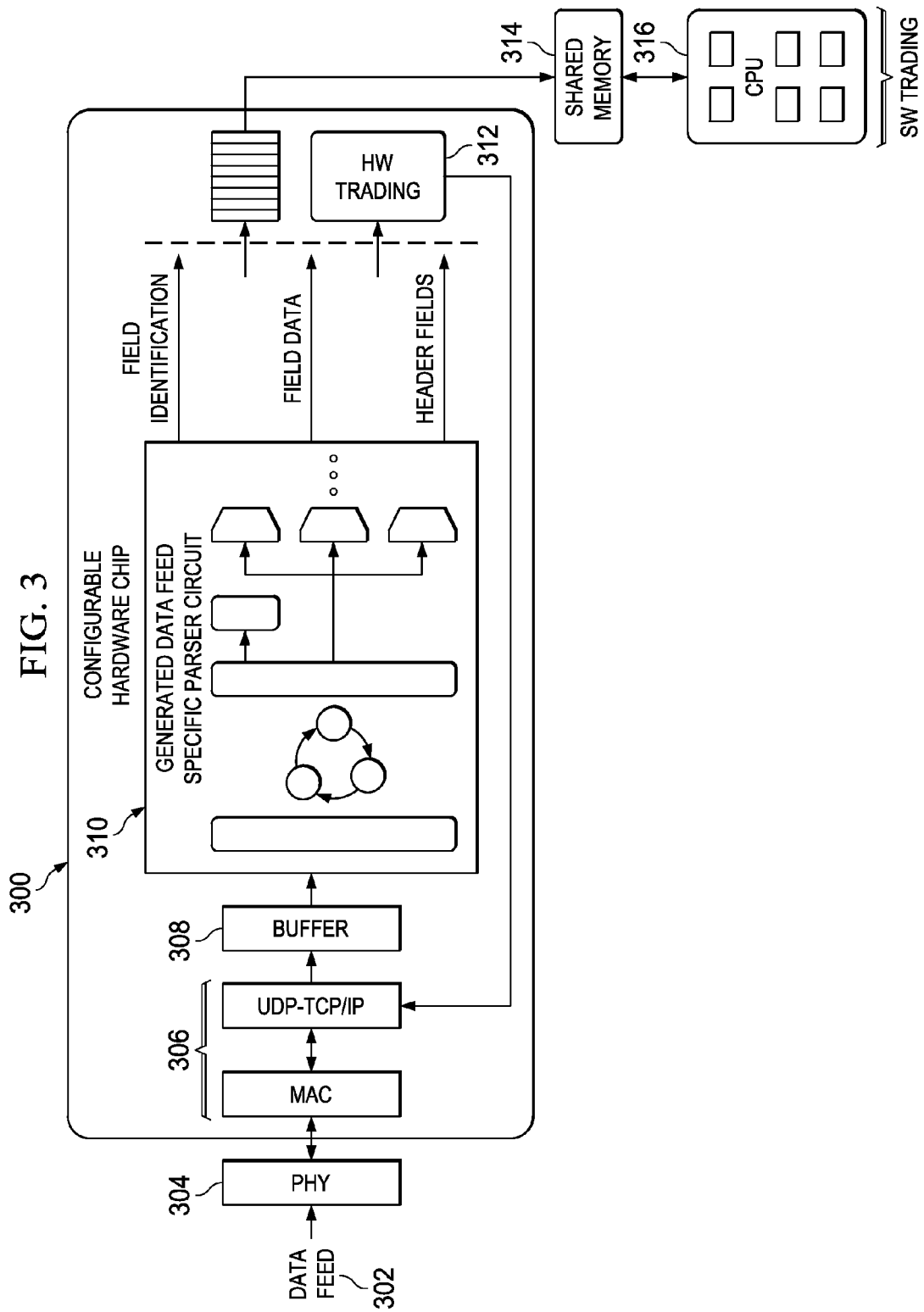
FIG. 3 is a diagram illustrating an example of a configurable hardware chip in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables. In addition, network 102 may transmit data at a speed of, for example, ten gigabits per second or higher.

In the depicted example, server 104 and server 106 connect to network 102, along with storage unit 108. Server 104 may be, for example, a financial data feed server device with high speed connections to network 102. Server 104 may reside, for example, within a stock exchange and represent a plurality of servers providing financial services to a plurality of client devices. Server 106 may be, for example, a news data feed server device associated with a news network that provides news services to client devices. Further, server 106 may also represent a plurality of server devices. Furthermore, it should be noted that server 104 and server 106 may provide other types of data feed services, such as a sports data feed, a gaming data feed, or any other type of feed that streams updated data on a real time basis.

Storage unit 108 is a network storage device capable of storing data in a structured or unstructured format. Storage unit 108 may be, for example, a network storage device that provides storage for feed data of one or more stock exchanges. Further, it should be noted that storage unit 108 may store other data, such as customer information that may include user identification and passwords.

Clients 110, 112, and 114 also connect to network 102. Clients 110, 112, and 114 are clients to server 104 and/or server 106. In the depicted example, server 104 and server 106 may provide information, such as boot files, operating system images, and applications to clients 110, 112, and 114. In this example, clients 110, 112, and 114 are data processing systems, such as, for example, network computers, personal computers, laptop computers, handheld computers, personal digital assistants, smart phones, or gaming devices. Users may utilize clients 110, 112, and 114 to receive and view feed data provided by server 104 and/or server 106. Furthermore, it should be noted that network data processing system 100 may include additional server devices, client devices, and other devices not shown.

Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, display 214, and configurable hardware chip 216.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A storage device is any piece of hardware that is capable of storing information, such as, for example, without limitation, data, program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores compiler software program 220 and feed format specification file 222. Data processing system 200 uses compiler software program 220 to read feed format specification file 222, parse feed format specification file 222, and generate an internal data structure of feed format specification file 222. Parsing means to analyze the text of feed format specification file 222 to determine the text's structure and then to generate the internal representation of feed format specification file 222 for use in subsequent processing.

Feed format specification file 222 is a data file that stores a textual description of a particular data feed, which includes a data format of the particular data feed. A user, such as a system administrator, encodes the data feed format into feed format specification file 222, which compiler software program 220 is able to read. It should be noted that illustrative embodiments utilize a different feed format specification file for each particular data feed to be processed by configurable hardware chip 216. Data processing system 200 also uses compiler software program 220 to automatically generate circuits on configurable hardware chip 216 using the generated internal data structure of feed format specification file 222 and a base feed parser circuit architecture template. The generated internal data structure may be, for example, a parse tree, an abstract syntax tree, or any other type of hierarchical data structure used to organize and store the information for later use. The generated circuits provide efficient, low latency processing of data feeds from different data feed sources by configurable hardware chip 216.

Configurable hardware chip 216 is an example of an integrated circuit (IC). In this example, data processing system 200 uses configurable hardware chip 216 to receive and process a particular incoming data feed. In other words, data processing system 200 does not use processor unit 204 to process the incoming data feed, but instead uses configurable hardware chip 216. Also, data processing system 200 specifically configures or programs configurable hardware chip 216 to process the particular data feed. The data feed may be from, for example, a particular stock exchange that uses a particular data format for the data feed. Furthermore, data processing system 200 may configure configurable hardware chip 216 to process a plurality of different types of data feeds simultaneously.

Configurable hardware chip 216 may be, for example, a field programmable gate array (FPGA). A field programmable gate array is an integrated circuit designed to be configured after manufacture, hence "field programmable." The field programmable gate array contains logic blocks programmed to perform a function. The field programmable gate array configuration is specified using, for example, a hardware description language (HDL), such as Very High Speed Integrated Circuit Hardware Description Language (VHDL) or Verilog. An application-specific integrated circuit is an integrated circuit customized for a particular use, rather than intended for general-purpose use.

Communications unit 210, in this example, provides for communication with other data processing systems or devices. In this example, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information, such as, for example, financial data feed information, to a user.

Instructions for the operating system, applications, and/or programs may be located in storage devices 218, which are in communication with processor unit 204 and configurable hardware chip 216 through communications fabric 202. In this illustrative example, the instructions are in a functional form on persistent storage 208. These instructions may be loaded into memory 206 for running by processor unit 204 and configurable hardware chip 216. The processes of the different embodiments may be performed by configurable hardware chip 216 using computer implemented instructions, which may be located in a memory, such as memory 206. These instructions are referred to as program code, computer usable program code, or computer readable program code that may be read and run by configurable hardware chip 216. The program code, in the different embodiments, may be embodied on different physical or computer readable storage media, such as memory 206 or persistent storage 208.

Program code 224 is located in a functional form on computer readable media 226 that is selectively removable and may be loaded onto or transferred to data processing system 200 for running by configurable hardware chip 216. Program code 224 and computer readable media 226 form computer program product 228. In one example, computer readable media 226 may be computer readable storage media 230 or computer readable signal media 232. Computer readable storage media 230 may include, for example, an optical or magnetic disc that is inserted or placed into a drive or other device that is part of persistent storage 208 for transfer onto a storage device, such as a hard drive, that is part of persistent storage 208. Computer readable storage media 230 also may take the form of a persistent storage, such as a hard drive, a thumb drive, or a flash memory that is connected to data processing system 200. In some instances, computer readable storage media 230 may not be removable from data processing system 200.

Alternatively, program code 224 may be transferred to data processing system 200 using computer readable signal media 232. Computer readable signal media 232 may be, for example, a propagated data signal containing program code 224. For example, computer readable signal media 232 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 224 may be downloaded over a network to persistent storage 208 from another device or data processing system through computer readable signal media 232 for use within data processing system 200. For instance, program code stored in a computer readable storage media in a server data processing system may be downloaded over a network from the server to data processing system 200. The data processing system providing program code 224 may be a server computer, a client computer, or some other device capable of storing and transmitting program code 224.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 226 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments it was discovered that different stock exchanges and ticker plants disseminate financial feeds in different data formats. In addition, most traders subscribe to a plurality of financial feeds. As noted above, each of the plurality of financial feeds may use a different data feed format. Further, data field contents have to be extracted from the messages associated with the plurality of different financial data feeds. Due to the volume and rate of the different financial feeds, these messages need be processed at high throughput. In addition, due to the nature of high-frequency online trading, these messages need to be processed at low latency.

Current CPU-based software feed handler solutions impose the latency of the software solution. As a result, high throughput cannot be maintained by these software solutions. Current hardware solutions require hand-coded data feed handlers that are not transferable between the different financial feeds with different data formats. In addition, currently generated data feed handlers require a complex description of the format of the data feeds and are not tailored for the low latency and high throughput requirements of a financial trading framework.

With the increasing high volume of trading performed on stock exchanges, the increasing high volume of disseminated messages associated with the financial feeds, and the increasing high volume of online trading, the processing of the financial feeds at minimum latency and higher throughput are, not only key to keeping traders ahead of the competition, but necessary in order to process all the incoming messages associated with the financial feeds. When messages are dropped during dissemination, potentially valuable information is lost. Hence, subscribers are choosing to utilize state-of-the-art computing devices to perform trading and bookkeeping functions. Thus, configurable hardware chips are a good fit for data feed handling and processing, as these configurable hardware chips are able to sustain high throughput and low-latency when well designed, operating at network speeds of up to ten gigabits per second or higher, while exploiting parallelism.

Financial feed data should be abstracted for the subscribers that only show an interest in the content of the financial feed data, rather than the format of the data. Furthermore, due to the multitude of differing financial feed formats, designing a financial feed format specific hardware architecture is problematic because transferring a hardware solution from one financial feed format to another feed format is a non-trivial process when targeting a high-performance hardware-based architecture. Moreover, this process must be repeated for every different financial feed format that a subscriber is subscribed to.

Illustrative embodiments provide a feed format specific specification file that use a simplified data feed format textual description. In addition, illustrative embodiments automatically generate a data feed specific hardware parser circuit that is described using the simplified data feed format textual description within the data feed format specific specification file. This is in contrast to a hand-written hardware description of a hardware circuit, which is error prone and a lengthy process for current hardware solutions.

Illustrative embodiments abstract a data feed format of a particular data feed from data feed handling computations and operations, such as stock trading in the case of financial data feeds. Utilizing a configurable hardware chip with a plurality of parallel circuits, data feeds are parsed at network speed, with no stall cycles required. Also, the automatically generated data feed specific hardware parser circuit may be configured for a given target throughput. Further, the overall latency of the automatically generated data feed specific hardware parser circuit is very low, which is in contrast with software solutions and non-efficient hardware solutions.

Thus, illustrative embodiments provide low-latency, high-bandwidth parsing or handling of data feeds using a single configurable hardware chip. The configurable hardware chip may be, for example, a reconfigurable logic, such as a FPGA. Feed parsing involves extracting different data fields from the data feed. Also, illustrative embodiments may apply to a variety of different financial feed formats, as well as non-financial feed formats, such as news feeds. In addition, data processing systems that utilize illustrative embodiments may subscribe directly to a particular data feed source or to a plurality of different data feed sources. Further, illustrative embodiments send the feed data directly to the generated data feed specific hardware parser circuit on the reconfigurable hardware chip, thereby reducing the overall latency.

Illustrative embodiments preserve the format of the data feed as originally disseminated. Moreover, illustrative embodiments parse or handle the incoming data feed as close to the subscriber's receiving network interface as possible, prior to storing the feed data on mass storage media or memories external to the configurable hardware chip. Feed parsing or handling refers to extracting information from data fields within messages associated with the data feed. Feed processing is the task of performing computations based on the extracted information.

The generated data feed specific hardware parser circuit provides for the simultaneous parallel extraction of data fields from a plurality of data bytes associated with the data feed using parallel parser circuits. The generated data feed specific hardware parser circuit performs this feed parsing in a streaming data mode at a network speed of up to ten gigabits of data per second or higher, providing very high throughput. Also, illustrative embodiments minimize the number of parallel pipeline stages and the memory block sizes required to simultaneously process a pre-determined number of data bytes associated with the data feed using the generated data feed specific hardware parser circuit and to meet the target throughput. Thus, the real time performance of illustrative embodiments is not affected by these minimizations.

Illustrative embodiments of the present invention provide a computer implemented method, computer system, and computer program product for generating a data feed specific parser circuit. In response to a computer receiving an input to generate a data feed specific parser circuit that corresponds to a particular data feed, the computer receives an input of a number of bytes of feed data associated with the particular data feed that the data feed specific parser circuit is to process in parallel per hardware clock cycle. The computer parses a feed format specification file that describes a data format of the particular data feed using a compiler to generate an internal data structure of the feed format specification file. In addition, the computer determines a minimum number of parallel pipeline stages in the data feed specific parser circuit to process the number of bytes of feed data associated with the particular data feed in parallel during a hardware clock cycle based on the generated internal data structure of the feed format specification file. Then, the computer generates a register-transfer level description of the data feed specific parser circuit with the determined minimum number of parallel pipeline stages using a pre-defined base data feed parser circuit architecture template.

With reference now to FIG. 3, a diagram illustrating an example of a configurable hardware chip is depicted in accordance with an illustrative embodiment. Configurable hardware chip 300 may be, for example, configurable hardware chip 216 in FIG. 2. In one illustrative embodiment, configurable hardware chip 300 may be a field programmable gate array.

A data processing system, such as data processing system 200 in FIG. 2, utilizes configurable hardware chip 300 to parse and process an incoming data feed, such as data feed 302. Data feed 302 may represent one data feed with a particular data format used by a particular data feed source, such as a stock exchange. Alternatively, data feed 302 may represent a plurality of different data feeds having a plurality of different data formats used by a plurality of different data feed sources, such as different news organizations and sports networks.

Data feed 302 includes certain characteristics or attributes. For example, each data feed must define a set of one or more message types associated with the data feed. Also, messages associated with a data feed may include a message header portion and a message payload portion. The message header portion may consist of one or more data fields. The header data fields may be of different lengths. The message type may be identified by any number of data fields within the message header portion. In addition, these header data fields that identify the message type need not be contiguous.

The message payload portion may consist of zero or more data fields. Payload data fields also may be of different lengths. However, it should be noted that data fields of a same message type have the same size, except for the last data field of a particular message, which may be of a variable length. In other words, data fields of a same message type are the same length in all messages having the same message type, except for the last data field of a particular message, which may have a different length.

The data feed sources transmit the data fields consisting of data only. In other words, the data feed sources do not transmit a field identifier or metadata associated with a particular data field. All data fields are present in the transmitted message, except for any contiguous group of data fields trailing a particular message, which a data feed source may choose to transmit or not.

Data feed 302 is a real time stream of data received from a data feed source through physical link 304. Physical link 304 may be, for example, communications unit 210 in FIG. 2. A data stream comprises several packets, each packet containing one or more data feed messages comprising bytes of feed data. Network interface hardware blocks 306 receive and extract the messages from the data stream packets. Network interface hardware blocks 306 may include, for example, Media Access Control (MAC) and User Datagram Protocol Transmission Control Protocol/Internet Protocol (UDP-TCP/IP) processing cores. Network interface hardware blocks 306 maintain online sessions with data feed sources, while preserving the required communication protocol specifications.

The extracted data feed messages comprising bytes of feed data are then stored in an intermediate buffer, such as buffer 308. However, it should be noted that illustrative embodiments do not require the data feed messages to be buffered prior to being sent to generated data feed specific parser circuit 310. In other words, network interface hardware blocks 306 may send the extracted data feed messages directly to generated data feed specific parser circuit 310, without utilizing buffer 308.

Generated data feed specific parser circuit 310 parses the data feed messages to extract data field values from the messages. Also, it should be noted that generated data feed specific parser circuit 310 extracts a plurality of data field values simultaneously in parallel during one hardware clock cycle using a plurality of parallel pipeline stages to parse a pre-determined number of bytes of feed data. Once the data field values are extracted from the messages, generated data feed specific parser circuit 310 may output the extracted data field values to a hardware data processing block, such as hardware trading processor 312, to perform additional processing of the extracted data field values and/or generated data feed specific parser circuit 310 may output the extracted data field values to a memory, such as shared memory 314, which is shared with other general purpose processors, such as CPU 316, the latter performing further computations in software. CPU 316 may be, for example, processor unit 204 in FIG. 2.

Moreover, generated data feed specific parser circuit 310 may represent a plurality of generated data feed specific parser circuits. In other words, configurable hardware chip 300 may process a plurality of different data feeds simultaneously using a plurality of different generated data feed specific parser circuits, each of which is tailored to handle a corresponding data feed. Thus, one data feed specific parser circuit is generated for each particular data feed that configurable hardware chip 300 receives from data feed sources.

Figure 4:
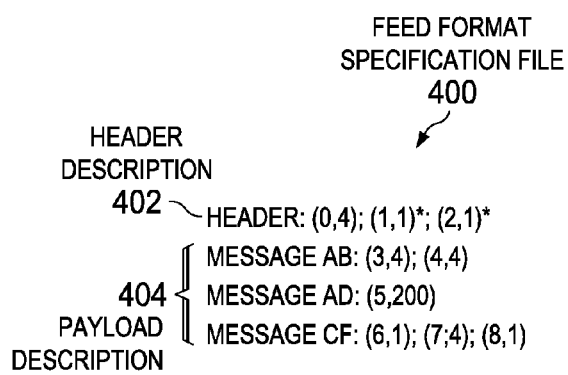
FIG. 4 is an example of a feed format specification file in accordance with an illustrative embodiment.

With reference now to FIG. 4, an example of a feed format specification file is depicted in accordance with an illustrative embodiment. Feed format specification file 400 is a data file that stores a textual description of a particular data feed provided by a particular data feed source. A user defines the data format of the particular data feed within feed format specification file 400. Feed format specification file 400 may be, for example, feed format specification file 222 in FIG. 2. Also, feed format specification file 400 is amenable to translation by a compiler, such as compiler software program 220 in FIG. 2.

It should be noted that feed format specification file 400 is only one possible example of a feed format specification file. In other words, feed format specification file 400 may include more or less information than what is illustrated in this particular example. In this particular example, feed format specification file 400 is divided into header description 402 and payload description 404. It should be noted that payload description 404 is respective to every message type.

Feed format specification file 400 defines a field descriptor for every data field, both message header and message payload alike. A field descriptor may be expressed in one of two ways. For example, a field descriptor may be expressed by using both a data field identifier and a data field size. Alternatively, a field descriptor may be expressed by only using a data field size.

A field identifier need not be unique. However, if a field identifier is excluded from a particular data field, a compiler, such as compiler software program 220 in FIG. 2, automatically assigns a unique field identifier to the respective data field. It should be noted that any combination of the two example field descriptor formats above may be used to describe data fields within a particular data feed. Also, the data field size may be defined in bits or bytes. However, in this particular example the data field sizes are noted in bytes. Also in this example, data fields are separated by a semicolon ";" character.

Header description 402 preferably utilizes a keyword to declare the header. The header keyword is followed by a list of field descriptors. Each header data field is associated with a field descriptor, with the order of data fields being maintained by the description. Further, data fields used to determine a message type of a particular message are followed by some type of marker. In this example, an asterisk "*" character is used as one such marker.

For every message type that is to be parsed, a respective message payload description is provided. However, empty payload messages do not need to be included in that list of message types to be parsed, as the message header description suffices in that particular situation. For example, certain control or administrative messages of some financial feeds may only include a message header description with empty payload messages.

Each message payload description within payload description 404 starts with a keyword that declares the message payload, followed by the message type. The message type data field size should conform to a total size of the marked "*" header data fields. In other words, smaller sized message identifiers are appended by, for example, space characters. Also, larger sized message identifiers are trimmed by the compiler.

The message type is then followed by a list of field descriptors. Each message payload field is associated with a field descriptor, with the order of data fields being maintained by the description. As stated above, the data fields are separated by the semicolon ";" character. Also in this example, the header description 402 includes three data fields, with identifiers of 0, 1, and 2, respectively. The sizes of the header data fields are 4 bytes, 1 byte, and 1 byte, respectively, with the last two data fields being used to identify the message type. Thus, the message type is 2 bytes in length. The message payload description is then presented. As indicated in the header description, each message has an identifier of 2 bytes.

Figure 5:
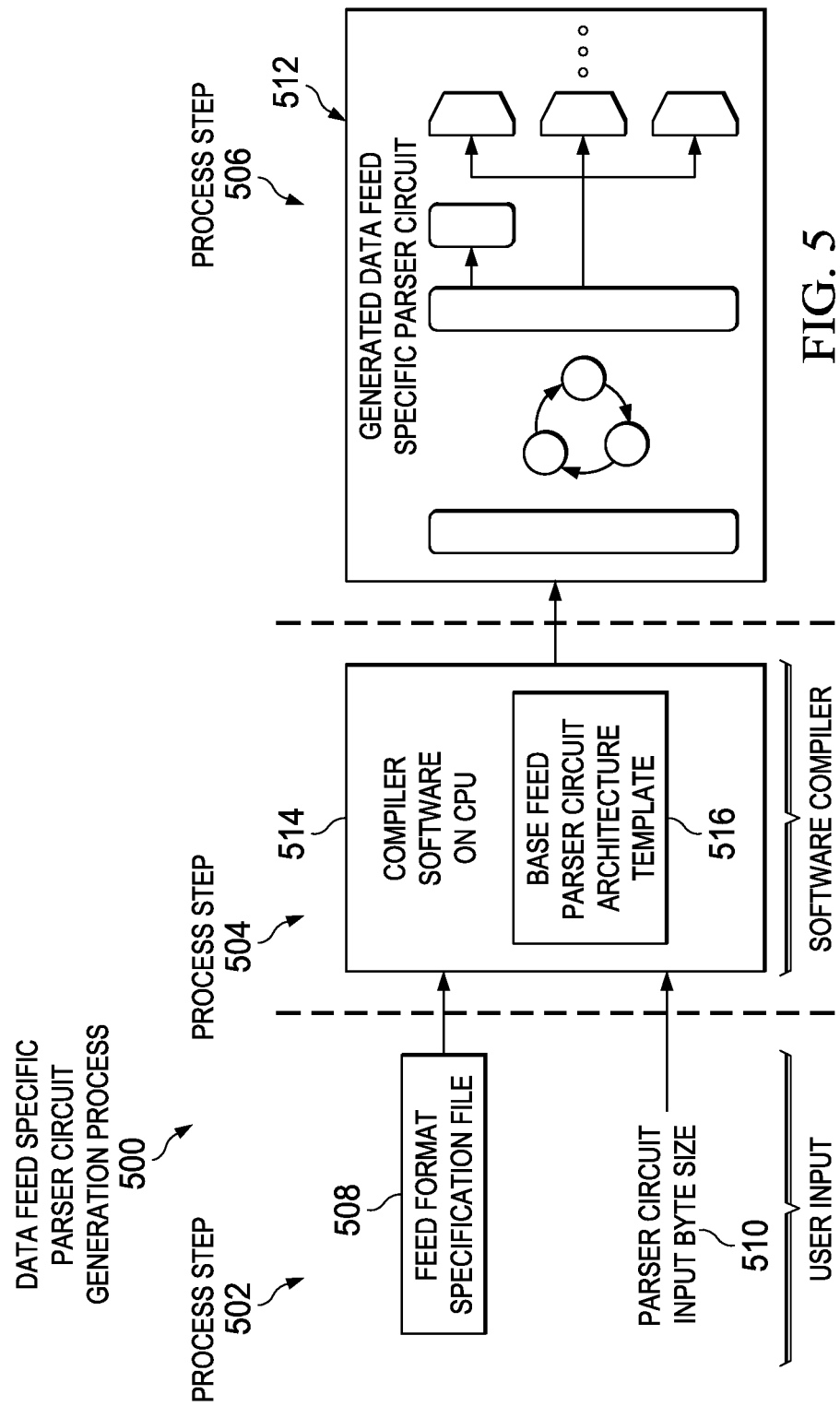
FIG. 5 is a high-level illustration of a generation process of a data feed specific parser circuit in accordance with an illustrative embodiment.

With reference now to FIG. 5, a high-level illustration of a generation process of a data feed specific parser circuit is depicted in accordance with an illustrative embodiment. In general, data feed specific parser circuit generation process 500 generates a high performance feed specific parser circuit using a feed format specification file and a base feed parser circuit architecture template. Data feed specific parser circuit generation process 500 may be, for example, implemented in a data processing system, such as data processing system 200 in FIG. 2. Data feed specific parser circuit generation process 500 includes process steps 502, 504, and 506.

At process step 502, the data processing system receives a user input of feed format specification file 508 and parser circuit input byte size 510. Feed format specification file 508 may be, for example, feed format specification file 400 in FIG. 4. Parser circuit input byte size 510 is the pre-determined number of bytes of feed data associated with a particular data feed that generated data feed specific parser circuit 512 is to simultaneously parse in parallel per hardware clock cycle.

The pre-determined number of bytes consists of N number of bytes of feed data that are parsed by generated data feed specific parser circuit 512 at a same time using a plurality of parallel pipelines within generated data feed specific parser circuit 512. In other words, parser circuit input byte size 510 refers to the data feed handling speed of generated data feed specific parser circuit 512, which is the number of bytes the parser circuit is able to process per hardware clock cycle, when feed data is available. N equals one or more bytes of feed data. A single "chunk" consisting of N number of bytes of feed data associated with a particular data feed may include one or more data fields within a message. Generated data feed specific parser circuit 512 parses each of the plurality of data fields simultaneously to extract all data field values using the plurality of parallel pipeline stages.

Compiler software 514 translates a textual representation of the data feed format within feed format specification file 508 to generate an internal data structure of the textual representation of the data feed format. Then, compiler software 514 generates a register transfer level description of data feed specific parser circuit 512 by combining the internal data structure of the data feed format with base feed parser circuit architecture template 516. Base feed parser circuit architecture template 516 is a pre-defined template of a base or standard hardware parser circuit architecture. Base feed parser circuit architecture template 516 may be defined by a user, such as a system administrator, or a group of users. Base feed parser circuit architecture template 516 is designed to handle a plurality of data bytes concurrently providing low latency parsing of data feeds. The data feeds may include a plurality of different data feed formats. Also, base feed parser circuit architecture template 516 is designed to handle parallel extraction of data fields by parallel circuits in a streaming mode at network speed.

Generated data feed specific parser circuit 512 is tailored specifically to handle a particular data feed, such as a financial data feed. However, it should be noted that software compiler 514 may generate a data feed specific parser circuit for any type of data feed that includes attributes required by illustrative embodiments.

Figure 6:
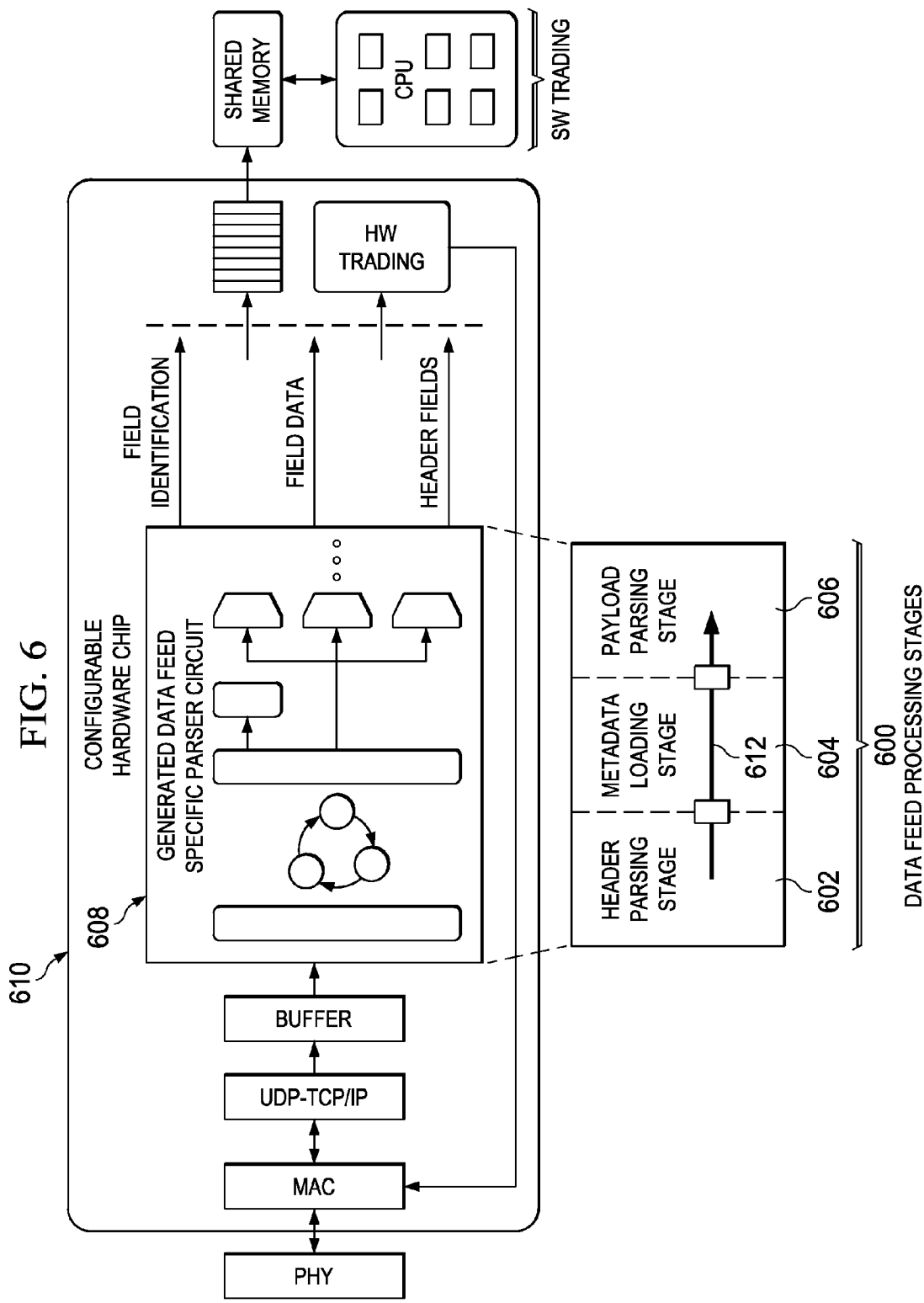
FIG. 6 is a high-level illustration of data feed processing stages of a generated data feed specific parser circuit in accordance with an illustrative embodiment.

With reference now to FIG. 6, a high-level illustration of data feed processing stages of a generated data feed specific parser circuit is depicted in accordance with an illustrative embodiment. Data feed processing stages 600 show the three main stages of data feed handling. Data feed processing stages 600 include header parsing stage 602, metadata loading stage 604, and payload parsing stage 606.

Data feed processing stages 600 are implemented in generated data feed specific parser circuit 608. Generated data feed specific parser circuit 608 is included within configurable hardware chip 610, such as, for example, generated data feed specific parser circuit 310 is included within configurable hardware chip 300 in FIG. 3. Arrow 612 represents the general data flow through stages 602-606 within generated data feed specific parser circuit 608.

Figure 7:
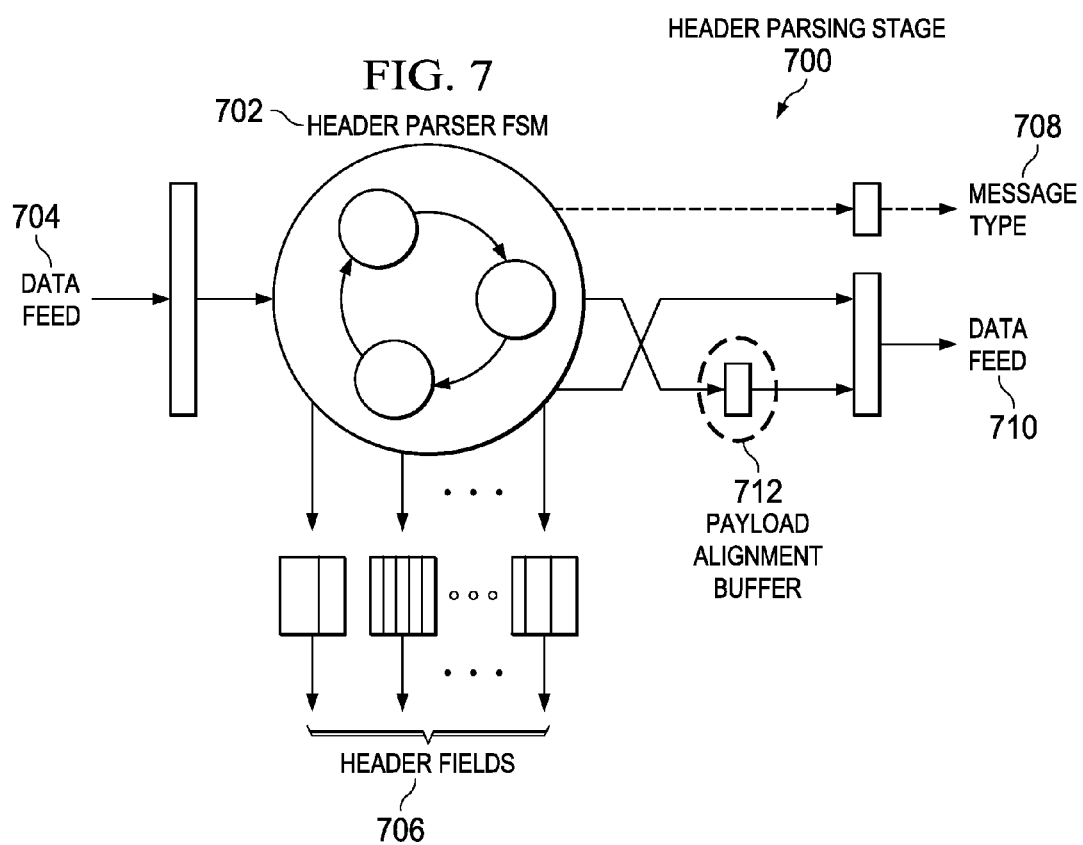
FIG. 7 is a diagram illustrating a header parsing stage of a generated data feed specific parser circuit in accordance with an illustrative embodiment.

With reference now to FIG. 7, a diagram illustrating a header parsing stage of a generated data feed specific parser circuit is depicted in accordance with an illustrative embodiment. Header parsing stage 700 may be, for example, header parsing stage 602 of generated data feed specific parser circuit 608 in FIG. 6. Header parsing stage 700 is implemented in header parser finite-state machine (FSM) 702.

A compiler, such as compiler software 514 in FIG. 5, generates header parser finite-state machine 702 to parse a pre-determined number of bytes of feed data per hardware clock cycle. The pre-determined number of bytes of feed data is associated with a particular data feed input, such as data feed 704. Header parser finite-state machine 702 includes two main states: a message header parser state and a message payload pass through state.

The header parsing state extracts header data fields and passes the extracted header data fields, such as header fields 706, as output, preferably using one output port per extracted header data field. While extracting the header data fields, header parser finite-state machine 702 also extracts and buffers message type 708 from known message locations on the configurable hardware chip. Also during the message header parsing state, header parser finite-state machine 702 passes the parsed header data to the remainder of the parser pipeline as invalid.

After header parser finite-state machine 702 completely parses the message header data, the remainder of the message consists of the payload data. Then, header parser finite-state machine 702 transitions to the message payload pass through state where header parser finite-state machine 702 passes the message payload data, such as data feed 710, to the remaining stages of the parser pipeline. If the header size is not a multiple of the parser circuit input byte size, such as parser circuit input byte size 510 in FIG. 5, then one "chunk" of feed data bytes would include both message header data and message payload data. In such cases, payload alignment buffer 712 aligns the message payload data. The purpose of payload alignment is to insure that the first byte of the first payload "chunk" of feed data consists of payload data, which is in contrast to header data. In other words, when valid, data feed 710 consists of payload data that are forwarded from header parsing stage 700 to further parsing stages, independently of the header size and the pre-determined number of bytes parsed per hardware clock cycle. It should be noted that payload alignment is not necessary, but the payload alignment facilitates the implementation of further parsing stages, as in metadata loading stage 604 and payload parsing stage 606 in FIG. 6. This message payload data alignment will affect the "chunks" of bytes forwarded to the remainder of the parser pipeline.

When header parser finite-state machine 702 passes the message payload data through to the remaining stages of the parser pipeline, header parser finite-state machine 702 looks for a pre-determined message terminating character, such as hex "1F", which is mainly used with optional and variable length fields. Special considerations are used to support situations where pauses in the message payload reads exist, which may be caused by the rate of data feed handling being greater than the rate of the network communication blocks (UPD-TCP/IP), such as network interface hardware blocks 306 in FIG. 3, producing the messages. In other words, the network communication blocks are not keeping up with the processing capability of the generated data feed specific parser circuit. Stated differently, the generated data feed specific parser circuit is processing messages faster than the network communication blocks are able to provide the messages to the generated data feed specific parser circuit. Further, it should be noted that the special considerations for the pauses may be deployed through all parser stages in the examples of FIGS. 7-9.

Figure 8:
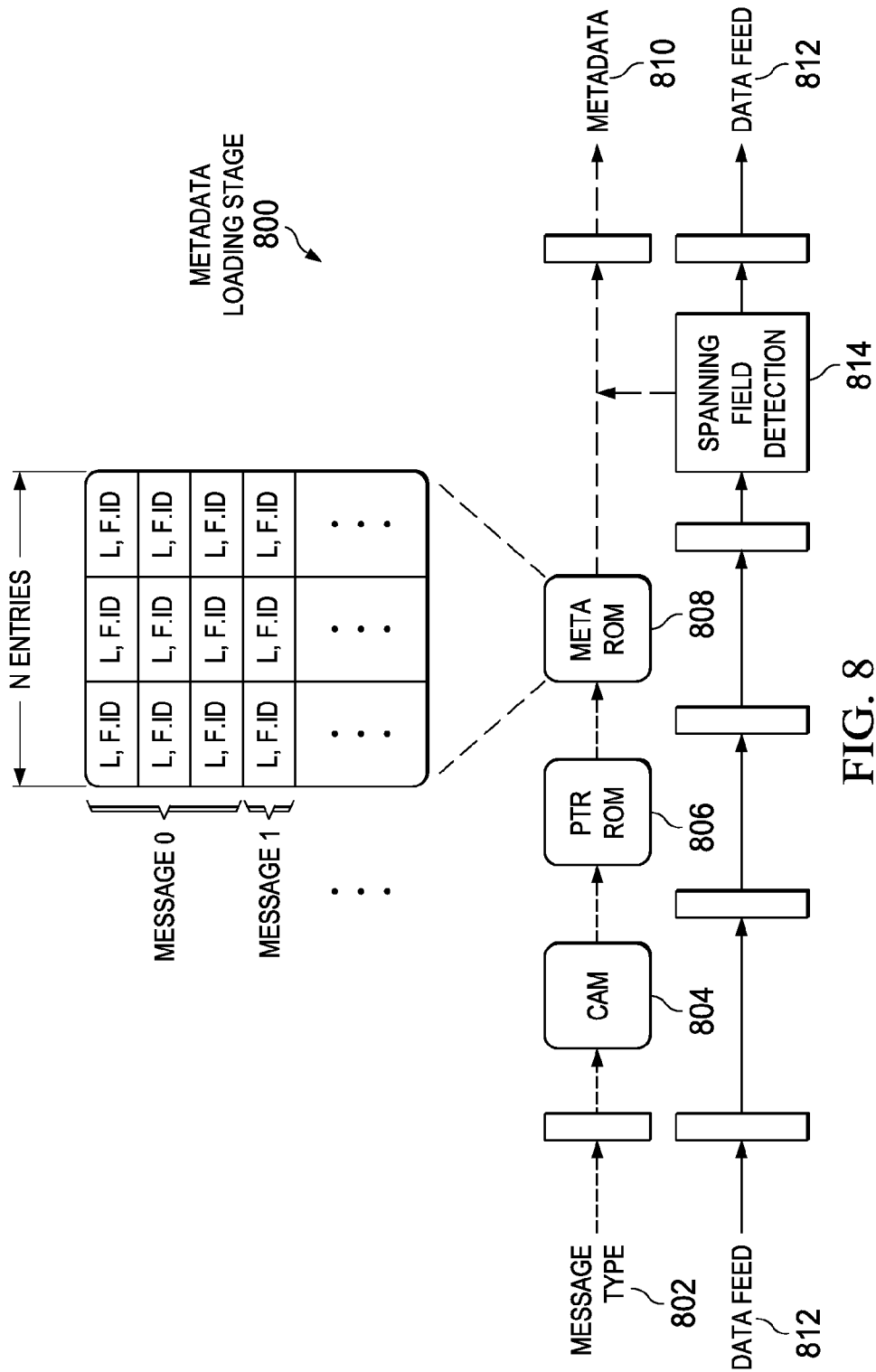
FIG. 8 is a diagram illustrating a metadata loading stage of a generated data feed specific parser circuit in accordance with an illustrative embodiment.

With reference now to FIG. 8, a diagram illustrating a metadata loading stage of a generated data feed specific parser circuit is depicted in accordance with an illustrative embodiment. Metadata loading stage 800 may be, for example, metadata loading stage 604 of generated data feed specific parser circuit 608 in FIG. 6.

In metadata loading stage 800, the generated data feed specific parser circuit first passes message type 802, such as message type 708 in FIG. 7, to content addressable memory (CAM) 804 whose output is an encoded message type address within pointer read only memory (ptr ROM) 806. A content addressable memory is a hardware search engine that is much faster than algorithmic approaches for search-intensive applications. A content addressable memory is composed of conventional semiconductor memory with added comparison circuitry that enables a search operation to complete in a single clock cycle.

Next, pointer read only memory 806 outputs an address within metadata read only memory 808 of metadata 810, which is associated with data feed 812. Pointer read only memory 806 is necessary because messages within data feed 812 may be of varying byte sizes. Within metadata read only memory 808, a data field identifier of every message byte is stored alongside a bit that indicates whether a message byte is the last byte of its respective data field. Every line within metadata read only memory 808 contains metadata information for each chunk of feed data that includes a plurality of bytes. Metadata for the maximum length of variable length data fields are also stored within metadata read only memory 808. Using the message terminating character detection from the header parsing stage, such as header parsing stage 700 in FIG. 7, the generated data feed specific parser circuit overrides the "last in field" bit in metadata loading stage 800. Further, the generated data feed specific parser circuit requires control logic to operate metadata read only memory 808 in order to read from the correct address location as offset by the base address provided by the pointer read only memory 806.

Furthermore, the generated data feed specific parser circuit uses spanning field detection 814 to detect bytes of data fields that span across "chunks" of feed data. However, it should be noted that instead of deploying spanning field detection 814, illustrative embodiments may include additional metadata in the metadata read only memory, such as metadata read only memory 808 in FIG. 8, such that every byte of every "chunk" of feed data has an extra "spanning byte" bit included. Alternatively, illustrative embodiments may use a "first in field" bit instead of a "last in field" bit. In other words, illustrative embodiments may deploy one of many different methods to achieve the same task.

Spanning field detection 814 sets a byte as spanning different chunks of feed data if the last byte of the previous chunk was not the last of its data field, and no preceding byte in the current chunk is the last of its data field. Also, instead of spanning field detection 814 computing on the fly, spanning field detection 814 may store the spanning data field information within metadata read only memory 808, at a minimal extra storage cost. Spanning field detection 814 appends a "spanning" bit to the metadata of every spanning byte that is passed to the next pipeline stages. The generated data feed specific parser circuit passes metadata 810 associated with data feed 812 to a data payload stage, such as data payload stage 606 in FIG. 6, of the generated data feed specific parser circuit. Also, it should be noted that a compiler, such as compiler software 514 in FIG. 5, determines the minimum size and contents of content addressable memory 804, pointer read only memory 806, and metadata read only memory 808 when the data processing system is in an off-line mode.

Figure 9:
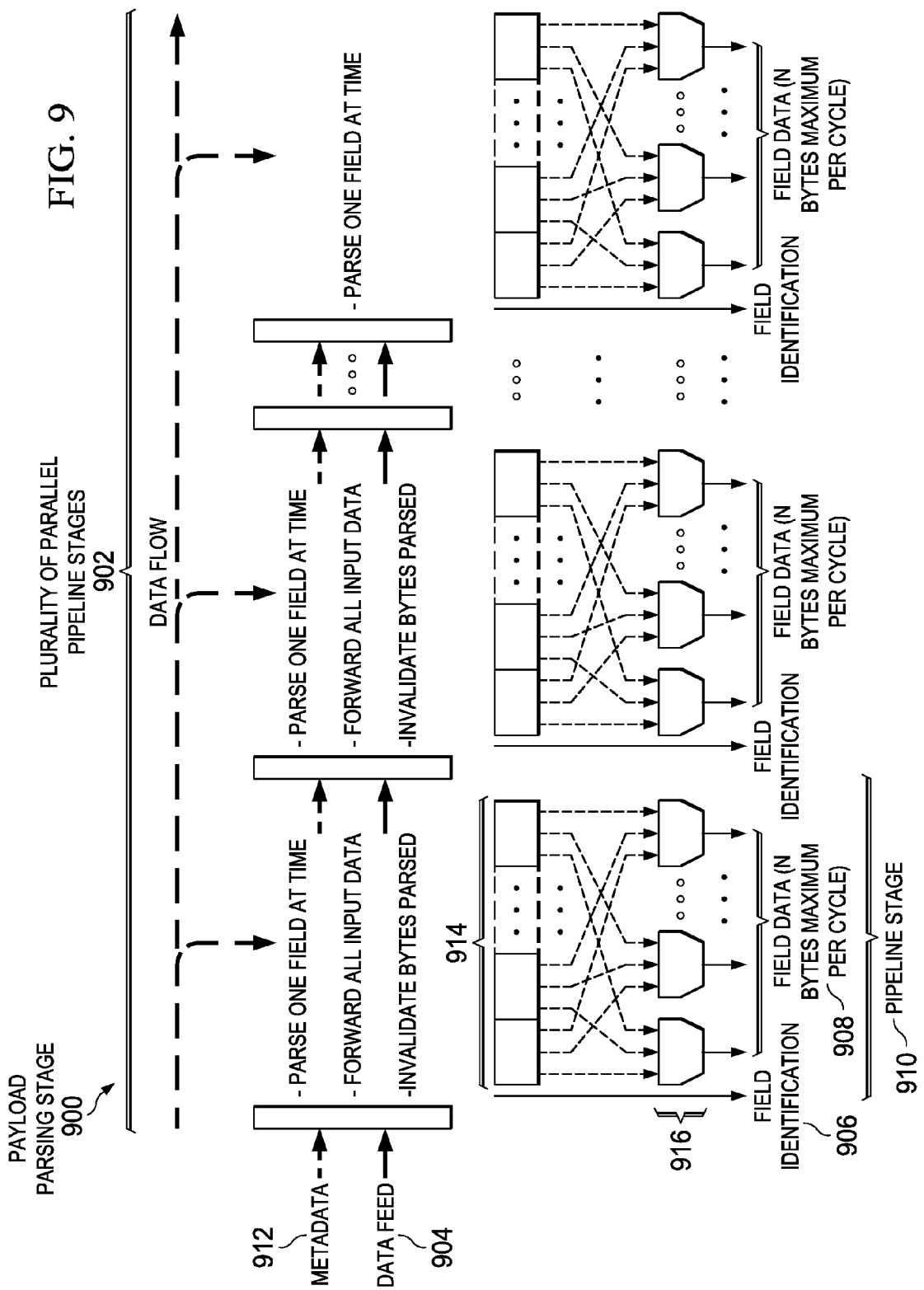
FIG. 9 is a diagram illustrating a payload parsing stage of a generated data feed specific parser circuit in accordance with an illustrative embodiment.

With reference now to FIG. 9, a diagram illustrating a payload parsing stage of a generated data feed specific parser circuit is depicted in accordance with an illustrative embodiment. Payload parsing stage 900 may be, for example, payload parsing stage 606 of generated data feed specific parser circuit 608 in FIG. 6.

In payload parsing stage 900, the generated data feed specific parser circuit parses several data fields at a same time in parallel, such that each pipeline stage 910 within plurality of parallel pipeline stages 902 parses one data field at a time. It should be noted that each pipeline stage 910 may internally include a set of one or more data field extractor blocks 914 that extract the data values from the data field. A plurality of parallel pipeline stages 902 are connected serially. The first pipeline stage 910 receives data feed 904, such as data feed 812 in FIG. 8, appended with metadata 912, such as metadata 810 in FIG. 8. With the exception of the first pipeline stage 910, all pipeline stages within plurality of parallel pipeline stages 902 receive data feed 904 and potentially modified metadata 912 from the previous pipeline stage. Starting from an initial state, if a pipeline stage receives valid bytes that are not spanning from a previous "chunk" of data feed 904, the pipeline stage parses all the bytes relative to that data field, marks all parsed data bytes as invalid, and forwards data feed 904 with potentially modified metadata 912 to the following pipeline stage. Once finished parsing that data field, the pipeline stage can parse another data field.

Also, the generated data feed specific parser circuit applies formatting, such as field identifier 906, to every data field parsed in order to re-align the data as extracted from the incoming chunks of data feed 904. The formatting of the parsed data fields may be achieved through several pipeline stages, for example. Multiplexers 916 output field data 908. Multiplexers 916 align the extracted field data 908 such that the first byte of output is the first byte of field data. Data alignment may be necessary since the extracted field data 908 may be at an offset in a "chunk" of data feed 904. Data alignment facilitates the task of further data processing by components that will later read and make use of the extracted field data 908. Also, it should be noted that extracted field data alignment may be implemented via, for example, four or five pipeline stages.

The output of every payload pipeline parsing stage includes field identifier 906 and field data 908. Field data 908 are the actual data values extracted from the data fields. In addition, the output may include control signals to indicate whether field data 908 are valid and/or last in its data field. Field identifier 906 and associated field data 908 may be processed by hardware trading blocks, such as hardware trading processor 312 in FIG. 3, and/or passed to a shared memory, such as shared memory 314 in FIG. 3.

In addition, it should be noted that the generated data feed specific parser circuit may use special consideration to support the situation where pauses in message payload reads exist, which may be caused by the rate of feed handling being greater than the rate of the network communication blocks producing messages. Also, it should be noted that a compiler, such as compiler software 514 in FIG. 5, determines the optimal number of pipeline stages within plurality of parallel pipeline stages 902. The optimal number of pipeline stages within plurality of parallel pipeline stages 902 is equal to the maximum number of data fields included within a single "chunk" of feed data to be processed in parallel by the generated data feed specific parser circuit during a single hardware clock cycle. The compiler may determine the optimal number of pipeline stages when generating the metadata read only memory contents.

Figure 10A:
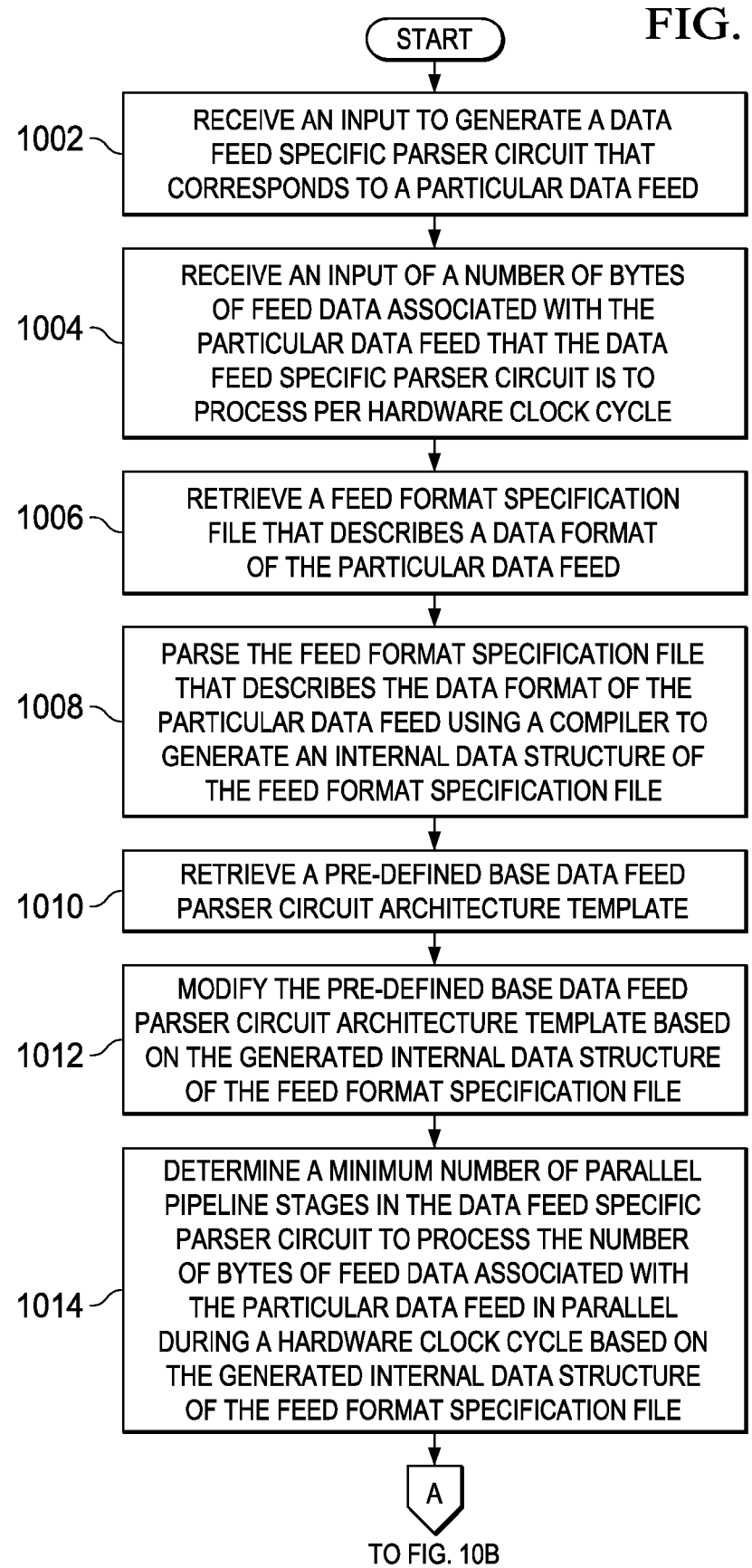
FIGS. 10A-10B are a flowchart illustrating a process for generating a data feed specific parser circuit in accordance with an illustrative embodiment.
Figure 10B:
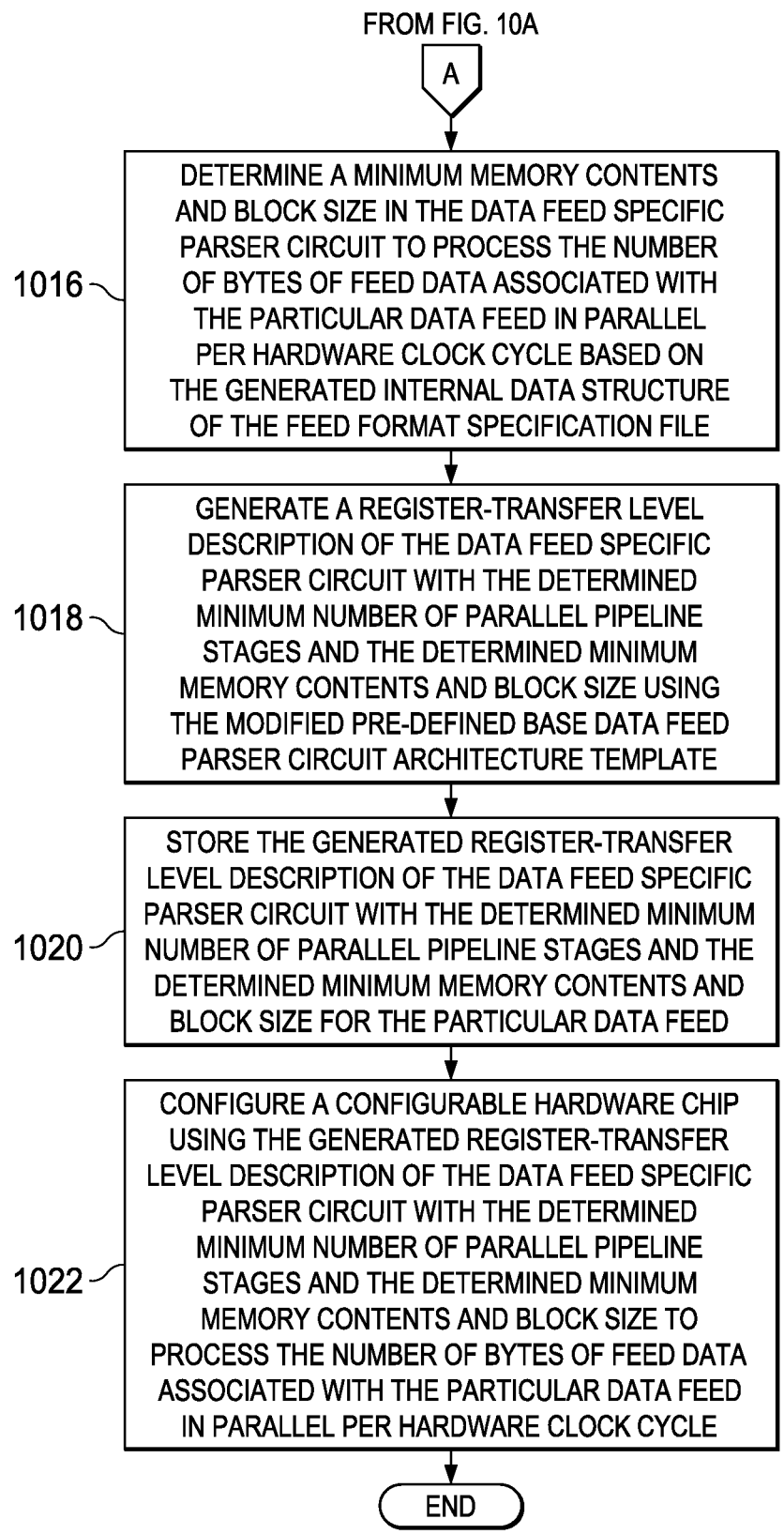

With reference now to FIGS. 10A-10B, a flowchart illustrating a process for generating a data feed specific parser circuit is shown in accordance with an illustrative embodiment. The process shown in FIGS. 10A-10B may be implemented in a data processing system, such as, for example, data processing system 200 in FIG. 2.

The process begins when the data processing system receives an input to generate a data feed specific parser circuit that corresponds to a particular data feed (step 1002). The data feed specific parser circuit that corresponds to the particular data feed may be, for example, generated data feed specific parser circuit 310 that corresponds to data feed 302 in FIG. 3. In addition, the data processing system receives an input of a number of bytes of feed data associated with the particular data feed that the data feed specific parser circuit is to process in parallel per hardware clock cycle (step 1004). The number of bytes of feed data input may be, for example, parser circuit input byte size 510 in FIG. 5.

Then, the data processing system retrieves a feed format specification file that describes a data format of the particular data feed (step 1006). The feed format specification file may be, for example, feed format specification file 508 in FIG. 5. After retrieving the feed format specification file in step 1006, the data processing system parses the feed format specification file that describes the data format of the particular data feed using a compiler to generate an internal data structure of the feed format specification file (step 1008). The compiler may be, for example, compiler software 514 in FIG. 5. Further, the data processing system retrieves a pre-defined base data feed parser circuit architecture template, such as base feed parse circuit architecture template 516 in FIG. 5 (step 1010).

Subsequently, the data processing system modifies the pre-defined base data feed parser circuit architecture template based on the generated internal data structure of the feed format specification file (step 1012). Furthermore, the data processing system determines a minimum number of parallel pipeline stages in the data feed specific parser circuit to process the number of bytes of feed data associated with the particular data feed in parallel during a hardware clock cycle based on the generated internal data structure of the feed format specification file (step 1014). The data processing system also determines a minimum memory contents and block size in the data feed specific parser circuit to process the number of bytes of feed data associated with the particular data feed in parallel per hardware clock cycle based on the generated internal data structure of the feed format specification file (step 1016).

Afterward, the data processing system generates a register-transfer level description of the data feed specific parser circuit with the determined minimum number of parallel pipeline stages and the determined minimum memory contents and block size using the modified pre-defined base data feed parser circuit architecture template (step 1018). The data processing system then stores the generated register-transfer level description of the data feed specific parser circuit with the determined minimum number of parallel pipeline stages and the determined minimum memory contents and block size for the particular data feed (step 1020). Moreover, the data processing system configures a configurable hardware chip using the generated register-transfer level description of the data feed specific parser circuit with the determined minimum number of parallel pipeline stages and the determined minimum memory contents and block size to process the number of bytes of feed data associated with the particular data feed in parallel during one hardware clock cycle (step 1022). The configurable hardware chip may be, for example, configurable hardware chip 300 in FIG. 3. The process terminates thereafter.

Figure 11B:
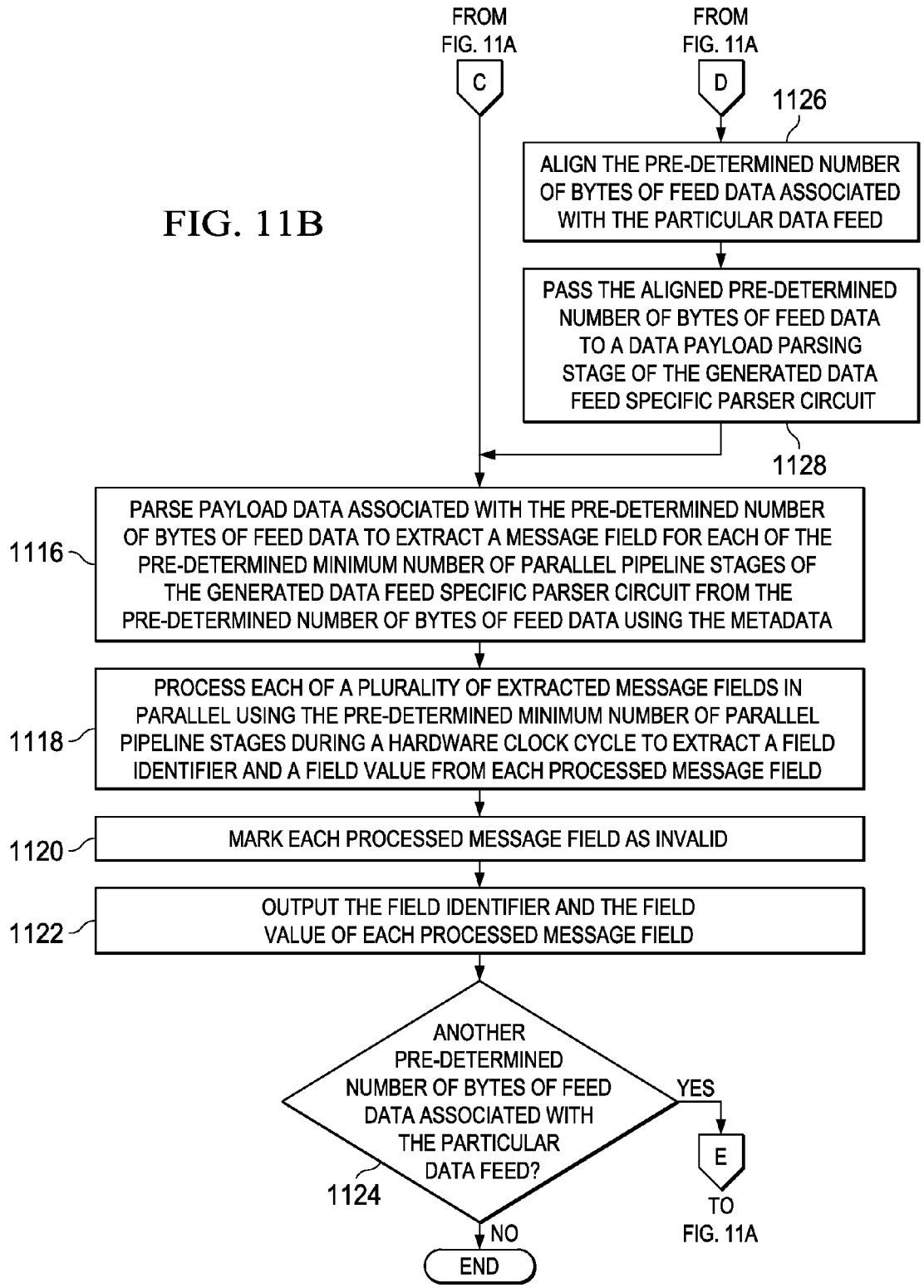

With reference now to FIGS. 11A-11B, a flowchart illustrating a process for processing a particular data feed by a generated data feed specific parser circuit is shown in accordance with an illustrative embodiment. The process shown in FIGS. 11A-11B may be implemented in a generated data feed specific parser circuit, such as, for example, generated data feed specific parser circuit 302 in FIG. 3. In addition, the generated data feed specific parser circuit may be implemented in a configurable hardware chip, such as configurable hardware chip 300 in FIG. 3, which may be located within a data processing system, such as data processing system 200 in FIG. 2.

The process begins when the generated data feed specific parser circuit receives from a server device via a network a particular data feed corresponding to the generated data feed specific parser circuit (step 1102). The generated data feed specific parser circuit includes a pre-determined minimum number of parallel pipeline stages and a pre-determined minimum memory contents and block size to process a pre-determined number of bytes of feed data associated with the particular data feed in parallel per hardware clock cycle. The memory contents, which are per byte of "chunk" of feed data, include a field ID and last in field bit. The metadata read only memory, such as metadata read only memory 808 in FIG. 8, is initialized to the memory contents. The metadata are deduced from the feed format specification file and the N number of bytes of feed data "chunk" size, such as feed format specification file 508 and parser circuit input byte size 510 in FIG. 5. The generated data feed specific parser circuit may receive the particular data feed from, for example, server 104 via network 102 in FIG. 1. The particular data feed may be, for example, a financial data feed of a particular stock exchange using a particular data format.

After receiving the particular data feed in step 1102, the generated data feed specific parser circuit retrieves the pre-determined number of bytes of feed data associated with the particular data feed, which the generated data feed specific parser circuit is to process during one hardware clock cycle, from a buffer (step 1104). The buffer may be, for example, buffer 308 in FIG. 3. After retrieving the pre-determined number of bytes of feed data associated with the particular data feed from the buffer, the generated data feed specific parser circuit makes a determination as to whether the pre-determined number of bytes of feed data includes message header data (step 1106). The message header data may be, for example, header description 402 in FIG. 4. If the generated data feed specific parser circuit determines that the pre-determined number of bytes of feed data does include message header data, yes output of step 1106, then the generated data feed specific parser circuit parses the message header data to extract a message type and other data fields associated with the message header data (step 1108). The message type may be, for example, message type 708 in FIG. 7.

Subsequently, the generated data feed specific parser circuit uses the extracted message type to look up a content addressable memory location that corresponds to an encoded message type address within a pointer read only memory, such as pointer read only memory 806 in FIG. 8 (step 1110). Then, the generated data feed specific parser circuit uses the encoded message type address within the pointer read only memory to look up an address of metadata associated with the pre-determined number of bytes of feed data within a metadata read only memory, such as metadata read only memory 808 in FIG. 8 (step 1112). The metadata read only memory stores a feed format specification file, such as feed format specification file 222 in FIG. 2, of the particular data feed. The feed format specification file includes the metadata associated with the pre-determined number of bytes of feed data.

Then, the generated data feed specific parser circuit passes the metadata, such as metadata 810 in FIG. 8, associated with the pre-determined number of bytes of feed data, such as data feed 812 in FIG. 8, to a data payload parsing stage, such as payload parsing stage 900 in FIG. 9, of the generated data feed specific parser circuit (step 1114). Afterward, the generated data feed specific parser circuit parses payload data associated with the pre-determined number of bytes of feed data to extract one message field for each of the pre-determined minimum number of parallel pipeline stages of the generated data feed specific parser circuit from the pre-determined number of bytes of feed data using the metadata (step 1116). The pre-determined minimum number of parallel pipeline stages of the generated data feed specific parser circuit may be, for example, plurality of parallel pipeline stages 902 in FIG. 9.

In addition, the generated data feed specific parser circuit processes each of a plurality of extracted message fields in parallel using the pre-determined minimum number of parallel pipeline stages during a hardware clock cycle to extract a field identifier and a field value, such as field identifier 906 and field data 908 in FIG. 9, from each processed message field (step 1118). Further, the generated data feed specific parser circuit marks each processed message field as invalid (step 1120). Subsequently, the generated data feed specific parser circuit outputs the field identifier and the field value of each processed message field (step 1122).

Then, the generated data feed specific parser circuit makes a determination as to whether there is another pre-determined number of bytes of feed data associated with the particular data feed (step 1124). If the generated data feed specific parser circuit determines that there is another pre-determined number of bytes of feed data associated with the particular data feed, yes output of step 1124, then the process returns to step 1104 where the generated data feed specific parser circuit retrieves the next pre-determined number of bytes of feed data from the buffer. If the generated data feed specific parser circuit determines that there is not another pre-determined number of bytes of feed data associated with the particular data feed, no output of step 1124, then the process terminates thereafter.

Returning now to step 1106, if the generated data feed specific parser circuit determines that the pre-determined number of bytes of feed data does not include message header data, no output of step 1106, then the generated data feed specific parser circuit aligns the pre-determined number of bytes of feed data associated with the particular data feed (step 1126). Afterward, the generated data feed specific parser circuit passes the aligned pre-determined number of bytes of feed data to the data payload parsing stage of the generated data feed specific parser circuit (step 1128). Thereafter, the process proceeds to step 1116 where the generated data feed specific parser circuit parses the payload data associated with the pre-determined number of bytes of feed data.

Thus, illustrative embodiments of the present invention provide a computer implemented method, computer system, and computer program product for generating a data feed specific parser circuit. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for generating a data feed specific parser circuit, the computer implemented method comprising:
    receiving, by the computer, an input of a number of bytes of feed data associated with a particular data feed that the data feed specific parser circuit is to process;
    parsing, by the computer, a feed format specification file that describes a data format of the particular data feed using a compiler to generate an internal data structure of the feed format specification file;
    determining, by the computer, a minimum number of parallel pipeline stages in the data feed specific parser circuit to process the number of bytes of feed data associated with the particular data feed in parallel during a hardware clock cycle based on the generated internal data structure of the feed format specification file;
    determining, by the computer, a minimum memory contents and block size in the data feed specific parser circuit to process the number of bytes of feed data associated with the particular data feed in parallel during the hardware clock cycle based on the generated internal data structure of the feed format specification file;
    generating, by the computer, a description of the data feed specific parser circuit with the determined minimum number of parallel pipeline stages; and
    configuring, by the computer, a configurable hardware chip using the generated description of the data feed specific parser circuit with the determined minimum number of parallel pipeline stages and the determined minimum memory contents and block size to process the number of bytes of feed data associated with the particular data feed in parallel per hardware clock cycle.

2. The computer implemented method of claim 1 further comprising:
    modifying, by the computer, a pre-defined base data feed parser circuit architecture template based on the generated internal data structure of the feed format specification file.

3. The computer implemented method of claim 1, wherein the configurable hardware chip is a field programmable gate array.

4. The computer implemented method of claim 1, wherein the configurable hardware chip is configured to operate in a streaming data mode at a network speed of ten gigabits of data per second or higher with no stall cycles.

5. The computer implemented method of claim 1, wherein the generated description of the data feed specific parser circuit is in a hardware description language, and wherein the hardware description language is a Very High Speed Integrated Circuit Hardware Description Language.

6. The computer implemented method of claim 1, wherein the number of bytes of feed data associated with the particular data feed is a plurality of feed data bytes, and wherein the data feed specific parser circuit processes all of the plurality of feed data bytes in parallel during the hardware clock cycle using the pre-determined minimum number of parallel pipeline stages defined in the generated description of the data feed specific parser circuit.

7. The computer implemented method of claim 2, wherein the pre-defined base data feed parser circuit architecture template is designed to handle a plurality of data bytes concurrently providing low latency parsing of data feeds, and wherein the data feeds include a plurality of different data feed formats.

8. The computer implemented method of claim 2, wherein the pre-defined base data feed parser circuit architecture template is designed to handle parallel extraction of data fields by parallel circuits in a streaming mode at network speed.

9. A computer system for generating a data feed specific parser circuit, the computer system comprising:
a bus system;
a storage device connected to bus system, wherein the storage device stores computer readable program code; and
a processor connected to the bus system, wherein the processor executes the computer readable program code to receive an input of a number of bytes of feed data associated with a particular data feed that the data feed specific parser circuit is to process; parse a feed format specification file that describes a data format of the particular data feed using a compiler to generate an internal data structure of the feed format specification file; determine a minimum number of parallel pipeline stages in the data feed specific parser circuit to process the number of bytes of feed data associated with the particular data feed in parallel during a hardware clock cycle based on the generated internal data structure of the feed format specification file; determine a minimum memory contents and block size in the data feed specific parser circuit to process the number of bytes of feed data associated with the particular data feed in parallel during the hardware clock cycle based on the generated internal data structure of the feed format specification file; generate a description of the data feed specific parser circuit with the determined minimum number of parallel pipeline stages; and configure a configurable hardware chip using the generated description of the data feed specific parser circuit with the determined minimum number of parallel pipeline stages and the determined minimum memory contents and block size to process the number of bytes of feed data associated with the particular data feed in parallel per hardware clock cycle.

10. A computer program product stored on a computer readable storage device having computer readable program code embodied thereon that is executable by a computer for generating a data feed specific parser circuit, the computer program product comprising:
computer readable program code for receiving an input of a number of bytes of feed data associated with a particular data feed that the data feed specific parser circuit is to process;
computer readable program code for parsing a feed format specification file that describes a data format of the particular data feed using a compiler to generate an internal data structure of the feed format specification file;
computer readable program code for determining a minimum number of parallel pipeline stages in the data feed specific parser circuit to process the number of bytes of feed data associated with the particular data feed in parallel during a hardware clock cycle based on the generated internal data structure of the feed format specification file;
computer readable program code for determining a minimum memory contents and block size in the data feed specific parser circuit to process the number of bytes of feed data associated with the particular data feed in parallel during the hardware clock cycle based on the generated internal data structure of the feed format specification file;
computer readable program code for generating a description of the data feed specific parser circuit with the determined minimum number of parallel pipeline stages; and
computer readable program code for configuring a configurable hardware chip using the generated description of the data feed specific parser circuit with the determined minimum number of parallel pipeline stages and the determined minimum memory contents and block size to process the number of bytes of feed data associated with the particular data feed in parallel per hardware clock cycle.

11. The computer program product of claim 10 further comprising:
computer readable program code for modifying a pre-defined base data feed parser circuit architecture template based on the generated internal data structure of the feed format specification file.

12. The computer program product of claim 10, wherein the configurable hardware chip is a field programmable gate array.

13. The computer program product of claim 10, wherein the configurable hardware chip is configured to operate in a streaming data mode at a network speed of ten gigabits of data per second or higher with no stall cycles.

14. The computer program product of claim 10, wherein the generated description of the data feed specific parser circuit is in a hardware description language, and wherein the hardware description language is a Very High Speed Integrated Circuit Hardware Description Language.

15. The computer program product of claim 10, wherein the number of bytes of feed data associated with the particular data feed is a plurality of feed data bytes, and wherein the data feed specific parser circuit processes all of the plurality of feed data bytes in parallel during the hardware clock cycle using the pre-determined minimum number of parallel pipeline stages defined in the generated description of the data feed specific parser circuit.

16. A computer implemented method for processing a particular data feed, the computer implemented method comprising:
receiving, by a generated data feed specific parser circuit, a particular data feed that corresponds to the generated data feed specific parser circuit, wherein the generated data feed specific parser circuit includes a pre-determined minimum number of parallel pipeline stages and a pre-determined minimum memory contents and block size to process a pre-determined number of bytes of feed data associated with the particular data feed;
parsing, by the generated data feed specific parser circuit, payload data associated with the pre-determined number of bytes of feed data to extract one message field for each of the pre-determined minimum number of parallel pipeline stages from the pre-determined number of bytes of feed data using metadata associated with the pre-determined number of bytes of feed data;

processing, by the generated data feed specific parser circuit, all of a plurality of extracted message fields in parallel using the pre-determined minimum number of parallel pipeline stages during a hardware clock cycle to extract a field identifier and a field value from each processed message field;

outputting, by the generated data feed specific parser circuit, the field identifier and the field value of each processed message field;

determining, by the generated data feed specific parser circuit, whether the pre-determined number of bytes of feed data includes message header data;

responsive to the generated data feed specific parser circuit determining that the pre-determined number of bytes of feed data includes message header data, parsing, by the generated data feed specific parser circuit, the message header data to extract a message type from the message header data;

using, by the generated data feed specific parser circuit, the extracted message type to lookup a content addressable memory location that corresponds to an encoded message type address within a pointer read only memory;

using, by the generated data feed specific parser circuit, the encoded message type address within the pointer read only memory to lookup an address of the metadata associated with the pre-determined number of bytes of feed data within a metadata read only memory, wherein the metadata read only memory stores the metadata associated with the pre-determined number of bytes of feed data; and passing, by the generated data feed specific parser circuit, the metadata associated with the pre-determined number of bytes of feed data to a data payload parsing stage of the generated data feed specific parser circuit.

17. The computer implemented method of claim 16 further comprising:

responsive to the generated data feed specific parser circuit determining that the pre-determined number of bytes of feed data does not include message header data, aligning, by the generated data feed specific parser circuit, the pre-determined number of bytes of feed data associated with the particular data feed; and passing, by the generated data feed specific parser circuit, the aligned pre-determined number of bytes of feed data to the data payload parsing stage of the generated data feed specific parser circuit.

18. The computer implemented method of claim 16 further comprising:

marking, by the generated data feed specific parser circuit, each processed message field as invalid.

19. The computer implemented method of claim 16, wherein the pre-determined number of bytes of feed data associated with the particular data feed is a plurality of feed data bytes, and wherein the generated data feed specific parser circuit processes each of the plurality of feed data bytes in parallel during the hardware clock cycle using the pre-determined minimum number of parallel pipeline stages within the generated data feed specific parser circuit.

* * * * *